United States Patent [19]
Kenyon et al.

[11] Patent Number: 5,317,644
[45] Date of Patent: May 31, 1994

[54] METHOD FOR THE ENHANCEMENT OF CELL IMAGES

[75] Inventors: Christopher Kenyon; Peter Macklem; David Eidelman, all of Montreal, Canada

[73] Assignee: McGill University, Montreal, Canada

[21] Appl. No.: 899,602

[22] Filed: Jun. 16, 1992

[51] Int. Cl.$^5$ .............................................. G06K 9/54
[52] U.S. Cl. ........................................ 382/6; 382/54; 359/370
[58] Field of Search ...................... 382/6, 22, 54, 42, 8, 382/26; 359/368, 370, 371, 386, 389

[56] References Cited

U.S. PATENT DOCUMENTS

| | | | |
|---|---|---|---|
| 4,873,653 | 10/1989 | Grosskopf | 364/525 |
| 4,884,225 | 11/1989 | Fogarty | 382/54 |
| 4,932,044 | 6/1990 | Williams et al. | 382/6 |
| 4,991,224 | 2/1991 | Takahashi et al. | 382/26 |
| 5,020,113 | 5/1991 | Lo et al. | 382/42 |
| 5,119,444 | 6/1992 | Nishihara | 382/8 |

FOREIGN PATENT DOCUMENTS

| | | |
|---|---|---|
| 1160748 | 1/1984 | Canada . |
| 1179061 | 12/1984 | Canada . |
| 1193012 | 9/1985 | Canada . |
| 1221169 | 4/1987 | Canada . |
| 1228673 | 10/1987 | Canada . |
| 1230678 | 12/1987 | Canada . |
| 1263186 | 11/1989 | Canada . |
| 1291569 | 10/1991 | Canada . |
| 1301927 | 5/1992 | Canada . |

OTHER PUBLICATIONS

Improvement in the resolution of three-dimensional data sets collected using optical serial sectioning, F. Macias Garza, et al, 1989 Journal of Microscopy, vol. 153 Pt 2 Feb. 1989 pp. 205-221.
Confocal differential interference contrast (DIC) microscopy; including a theoretical analysis of conventional and confocal DIC imaging, C. J. Cogswell et al, Journal of Microscopy, vol. 165 Pt 1, Jan. 1992, pp. 81-101.
Extracting Geometric Models Through Constraint Minimization, (Miller J. A., Breen D. E., Wozny M. J., IEEE, 1990, CH2913-2.
The Nomarski interference-contrast microscope. An experimental basis for image interpretation. J. Padawer. Journal of The Royal Microscopic Society, 1968, vol. 88, part 3, pp. 305 to 349.
Gonzalez & Wintz, Digital Image Processing, Wiley, 1976, pp. 160-175.
Handbook of Biological Confocal Microscopy, James B. Pawley, Revised Edition, Plenum Press N.Y. and London, pp. 41-51.
New Edge detection methods on exponential filter, Castan, S. Zhao, J. Shen J. Proceedings 10th International Conference on Pattern Recognition (Cat. No. 90CH2898-5) pp. 709 to 711 vol. 1.
Wither Video Microscopy. Towards 4-D imaging at the Highest Resolution of the Light Microscope, Shinya Inoué, Optical Microscopy for Biology, pp. 497-511, 1990 Wiley-Liss Inc.

Primary Examiner—Leo H. Boudreau
Assistant Examiner—Larry J. Prikockis
Attorney, Agent, or Firm—Ronald S. Kosie; Robert Brouillette

[57] ABSTRACT

The present invention relates to an image processing method for enhancing the digitised optical image section of a (e.g. substantially transparent biological) specimen and in a particular aspect the boundary outline of a specimen in such an image section thereof. In accordance with the invention a Nomarski image section is smoothed and a gradient of image pixel intensity determined for each pixel thereof. Thereafter each pixel of the smoothed Nomarski image which has an intensity gradient within a reference range is set to zero intensity so as to provide a processed image section.

6 Claims, 6 Drawing Sheets

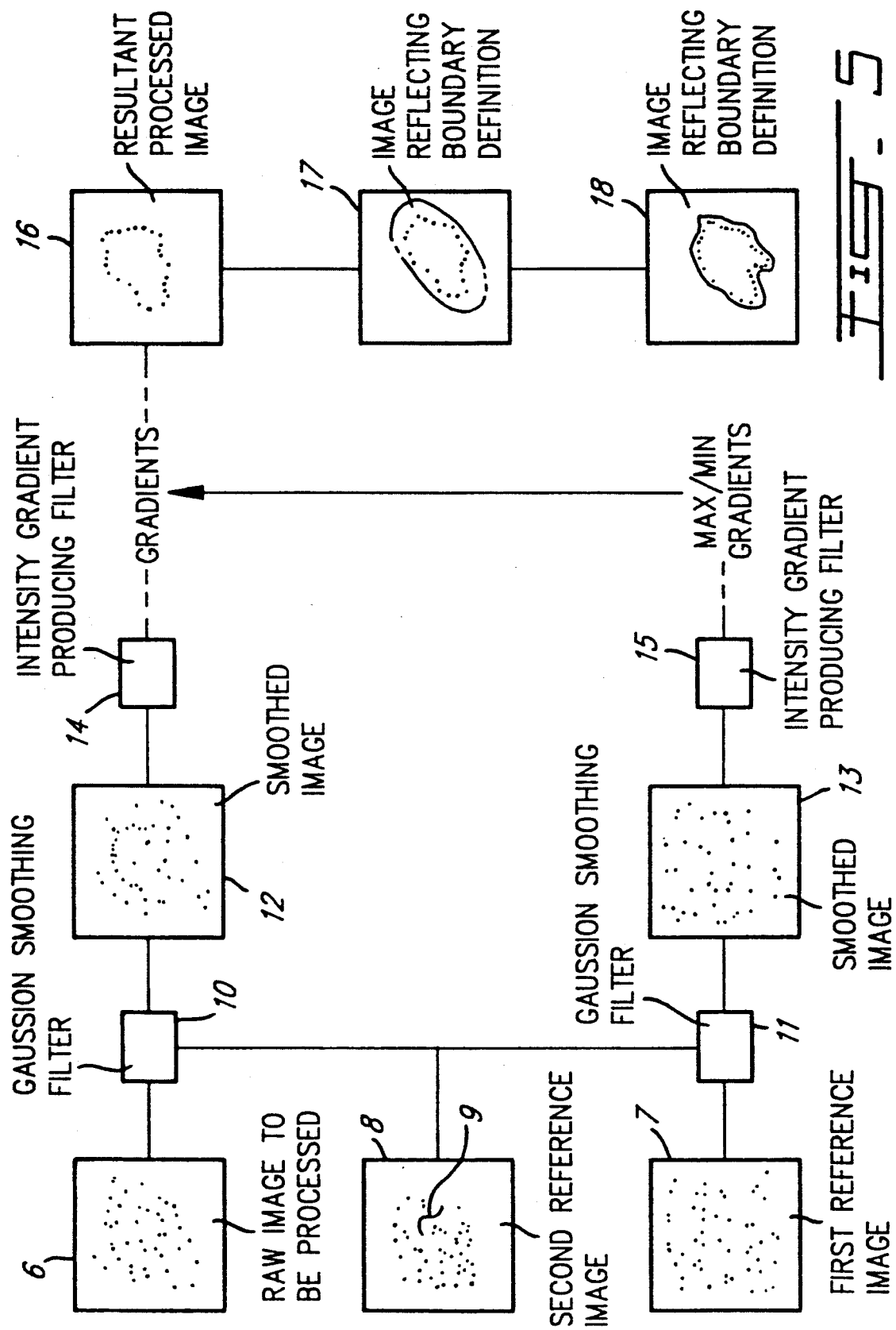

METHOD FOR THE ENHANCEMENT OF CELL IMAGES

The present invention relates to an image processing method for enhancing the digitised optical image section of a (e.g. substantially transparent biological) specimen and in a particular aspect the boundary outline of a specimen in such an image section thereof.

Optical microscope technology has made great strides in recent years due to the marriage of the optical microscope with computers and (digital) video recording equipment. It is now possible, for example, to use a light microscope to optically section a (transparent) specimen to provide a sequential series of digitised images of the (biological) specimen; see for example, "Wither Video Microscopy. Towards 4-D imaging at the Highest Resolution of the Light Microscope", Shinya Inoué, Optical Microscopy for Biology, pages 497-511, 1990 Wiley-Liss Inc.; "Improvement in the resolution of three-dimensional data sets collected using optical serial sectioning", F. Macias Garza, et al, 1989 Journal of Microscopy, Vol 153 Pt 2 February 1989 pp 205-221; "Confocal differential interference contrast (DIC) microscopy: including a theoretical analysis of conventional and confocal DIC imaging", C.J. Cogswell et al, Journal of Microscopy, Vol 165 Pt 1, January 1992, pp 81-101; "Handbook of Biological Confocal Microscopy" James B. Pawley, Revised Edition, Plenum Press N.Y. and London; U.S. Pat. No. 4,873,653. These (digitised) image sections can be treated with known algorithms for generating three dimensional reconstructions of the specimen. However, much work remains to be done with respect to methods for processing the digitised data of an image for subsequent 2D or 3D display.

As is known, three dimensional data can be obtained as a series of sequential two dimensional images taken at different focus positions for a specimen from an optical microscope equipped with a (digitizing) video camera system. In the detection of cell boundaries in optical slices or sections each two-dimensional slice is blurred by parts of the cell above and below the focal plane of the section. Removal of this blurring is desirable in order to facilitate rendering of the cell section visible and to also facilitate t bringing out the boundary of the cell or specimen.

It would be advantageous to have an alternate method for processing an optical image slice which is relatively simple and which can be used in association with conventional light microscope equipment.

It would also be advantageous to have a simple means for rendering the boundary of a cell in a slice visible.

It would further be advantageous to be able to have a means which can facilitate the automatic processing of a plurality of optical section which may thereafter be combined so as to model the surface of a moving cell and produce 3D (video) images from which the movement of a cell may be viewed so as to provide a means for studying the dynamics of cell topology, volume and surface area (for motile cells).

SUMMARY OF INVENTION

Accordingly, the present invention in one aspect provides a method of processing one or more raw light microscope optical image sections of a specimen to generate one or more processed optical image sections therefrom, wherein said raw image sections are raw Nomarski optical image sections of the specimen in digitised form such that the raw image sections are each composed of a plurality of digitised pixel points, said method comprising, a) subjecting a said raw Nomarski image section and a raw first reference optical image section to one dimensional Gaussian smoothing, in the direction of the Nomarski effect, with a predetermined decay constant so as to obtain a smoothed original image section and a smoothed first reference image section, said raw first reference image section being an out of focus optical image section with respect to the specimen, said raw first reference optical image section being an a raw Nomarski optical image section in digitised form such that the first reference image section is composed of a plurality of digitised pixel points, said constant being equal the thickness in pixel points (i.e. the number of pixel points) of a focused boundary of the specimen in a raw second reference Nomarski optical image section thereof, said raw second reference optical image section being a raw Nomarski optical image section in digitised form such that the raw second reference image section is composed of a plurality of digitised pixel points, b) determining, for each of the smoothed image sections obtained from step a) a gradient of image pixel intensity, in the direction of the Nomarski effect, for all of the pixel points thereof, c) determining the maximum and minimum intensity gradient values for the smoothed first reference image section, and d) setting to zero, the intensity of each pixel point of the smoothed original image section which has an intensity gradient value within the range defined by the maximum and minimum intensity gradients for the smoothed first reference image so as to obtain a processed digitised optical image section, any remaining pixel points of non zero intensity in the processed image section being feature pixel points.

The word smoothed in relation to an image is to be understood herein as referring to an image subjected to Gaussian smoothing so that the pixels have a more uniform intensity value; this is a known treatment in the art, e.g. see Gonzalez & Wintz, Digital image Processing, Wiley, 1976.

The intensity gradient may be determined in any suitable (known) manner.

In accordance with the present invention steps a) and b) may be carried out by exploiting a derivative exponential filter.

Thus, in accordance with another aspect, the present invention provides a method of processing one or more raw light microscope optical image sections of a specimen to generate one or more processed optical image sections therefrom, wherein said raw image sections are raw Nomarski optical image sections of the specimen in digitised form such that the raw image sections are each composed of a plurality of digitised pixel points, said method comprising, a) subjecting a said raw Nomarski image section and a raw first reference optical image section to one dimensional derivative exponential filtering, in the direction of the Nomarski effeot, with a predetermined decay constant so as to obtain a smoothed original image section and a smoothed first reference image section and to obtain a gradient of intensity, in the direction of the Nomarski effect, for all of the pixel points of the smoothed original image section and the smoothed first reference image section, said raw first reference image section being an out of focus optical image section with respect to the specimen said raw first reference optical image section being a raw Nomarski optical image section in digitised form such that the first reference image section is composed of a plurality of digitised pixel points, said constant being equal to the thickness in pixel points (i.e. the number of pixel points) of a focused boundary of the specimen in a raw second reference Nomarski optical image section thereof, said raw second reference optical image section being a raw Nomarski optical image section in digitised form such that the raw second reference image section is composed of a plurality of digitised pixel points, b) determining the maximum and minimum intensity gradient values for the smoothed first reference image section, and d) setting to zero, the intensity of each pixel point of the smoothed original image section which has an intensity gradient value within the range defined by the maximum and minimum intensity gradients for the smoothed first reference image so as to obtain a processed digitised optical image section, any remaining pixel points of non zero intensity in the processed image section being feature pixel points.

For some processed images the remaining group of feature pixels may include noise pixels. In such case, it may be desirable or necessary to set the intensity of these noise pixels to zero as well. These noise pixels may be identified and removed (i.e. the intensity set to zero) by first determining whether or not the number of non-zero pixels within a predetermined radius of a designated non-zero pixel is below a predetermined constant (e.g. a given number of pixels per unit area), if so that designated nonzero pixel's intensity is set to zero. The predetermined constant may, for example, fall within the range of 0.005 to 0.05 pixels per unit area, (e.g. 0.01 pixels per square pixel). The area about the designated non-zero pixel is equal to the area of the circle about this pixel based on the predetermined radius; the predetermined radius may for example fall in the range of up to 20 pixels e.g. 5 to 20 pixels provided that the object size (i.e. maximum length dimension) is from about 25 to 1000 pixels. The predetermined radius may initially be chosen on the basis of a visual inspection of the image; it may be twice the distance of a suspected noise pixel to the nearest believed non-noise feature pixel.

The optical image sections of the present invention may be obtained by exploiting conventional Nomarski optical microscopy instrument systems. Such a system may, for example, comprise 1) a suitable optical microscope (e.g. Olympus OMT2);
2) Nomarski attachments for the microscope;
3) CCD (charge coupled device) camera fitted to the camera port of the microscope;
4) a means for storing camera images in analogue format using for example an ordinary video recorder or an optical disc recorder;
5) a means of digitising either the camera images or the recorded camera images using a standard frame grabber board fitted in a computer;
6) a means of storing the images in digital form e.g. a hard disc within the computer;
7) a means of altering the vertical height of the focal plane of the microscope, e.g. a stepper motor controlled by the computer.

The raw nomarski images to be treated in accordance with the present invention can be recorded in conventional computer memory means, e.g. hard disks, tapes etc.

In accordance with the present invention the reference to the direction of the Nomarski effect refers to the direction in which the two polarised light beams are shifted relative to each other by the Wollaston prism (i.e. to the direction of optical shearing); please see "The Nomarski interference-contrast microscope An experimental basis for image interpretation. J. Padawer. Journal of The Royal Microscopic Society, 1968, Vol. 88, part 3, pp 305 to 349."

In accordance with the present invention the predetermined decay constant (for the Gausian smoothing and/or derivative exponential filtering) may be more or less equal to the thickness of a focused boundary of the specimen in a second reference original Nomarski image section; the thickness may be determined in conventional fashion by for example taking a photo and then based on the magnification factor determining the thickness of a focused boundary.

Thereafter the maximum and minimum intensity gradient values for the smoothed first reference image section is determined. If more than one original image is to be processed all of these original images will of course be smoothed and subjected to an intensity gradient determination (e.g. to derivative exponential filtering). Only one first reference image need be so treated for each volume image; preferably, however, new first image and second reference images should be used for each volume image ( a volume image being a complete set of image slices through the specimen; i.e. for studying the motion of the specimen there will of course be many such volume images taken per minute). The one or more smoothed original images are thereafter treated to set to zero intensity value, those pixels having gradients in the maximum and minimum range established for the first reference image as above. The remaining non-zero intensity pixels of an image are feature pixels; any noise pixels thereof, if desired being also set to zero intensity as indicated above.

In accordance with the present invention the derivative exponential filtering used may be any such known technique using the length scale mentioned above described by the decay constant in the derivative exponential filter, provided that the filtering occurs in the direction of the Nomarski effect as mentioned above. The description of the derivative exponential filtering may be found in "New edge detection methods on exponential filter" (Castan, S. Zhao, J. Shen J. Proceedings 10th International Conference on Pattern Recognition (Cat. No. 90CH2898-5) pp 709 to 711 Vol 1).

In accordance with the present invention, once the feature pixels have been brought out (and, if desired, any noise pixels thereof suppressed) a feature object in a so processed image may be defined in any suitable known manner. Similarly the boundary of a feature object may likewise be defined in any suitable known manner. Thus, in accordance with the present invention the image processing method may include the following additional steps e) defining a feature object in the processed digitised image section obtained from step d), and f) defining the boundary of said feature object to produce a developed optical image section in digitised form such that the developed image section is composed of digitised and identified boundary pixels.

However, in accordance with a further aspect of the present invention a feature object may in particular be defined in step e) above by defining about each feature pixel, a circle of the same predetermined radius, a feature object being defined by those groups of feature pixels whose circles touch; this radius may be determined as a function of the distance between points in a defined feature object, i.e. its value may be on the order of the size of the distance separating these feature pixels or it may, however, be different if so desired.

In accordance with an aspect of the present invention the boundary of a feature object in a processed optical image section may be determined using a modified constraint minimization technique. The constraint minimization technique itself is discussed in "Extracting Geometric Models Through Constraint Minimization", (Miller JA, Breen DE, Wozny MJ, IEEE, 1990, CH2913-2); however, the disclosed technique and functions has been found not to provide acceptable results when applied in the context of the present invention. Thus in accordance with this particular aspect of the present invention the boundary of a feature object may be defined by shrink wrap constraint minimization wherein the cost function has the following form:

$$C = F + A + D$$

wherein

F is the normal extending from a predetermined moving object (MO - see above Miller reference for details) and passing through the line joining two feature pixels neighboring the predetermined feature pixel and is negative in the inward direction, (e.g. $10\underline{n}$)

A is a function of the angle defined between the lines from the predetermined feature pixel and said neighboring feature pixels, and is positive if the angle is <45 or >135 (e.g. its value between 45 and 135 degrees may be zero otherwise it may have a positive non-zero value), D is a function of the distance of the predetermined feature pixel from said neighboring feature pixels, and is positive if the distance is greater than a predetermined base length and highly positive if greater than some predetermined multiple of said base length (e.g. D may equal (p/b)*3.0, if p, 3b, p=present length, b=base length=original distance between adjacent MO and if p>20b then D=30D.

Additionally, an MO is stopped and removed from further inclusion in the minimization process if it becomes adjacent to a non-zero intensity pixel. Furthermore if two MO's come within one pixel distance of each other they are combined into one. The initial positions's of the MO's may be for example on a circle centered on the centroid of the feature object with the radius given by the distance of the furtherest feature pixel from the centroid; the initial shape of the connected MO's may of course be different e.g. ellipse, square, etc . . .

As an alternate approach in accordance with a further aspect of the present invention the boundary of a feature object may be defined by stepping which comprises a') determining the centroid of a feature object b') determining an initial feature pixel of the feature object which is farthest away from the centroid c') selecting from the feature pixels within a predetermined radius of the initial feature pixel a second feature pixel whereby the line between the second feature pixel and the initial feature pixel defines the greatest angle with the line between the initial feature pixel and the centroid, d') defining the exterior direction by determining a vector at right angles to the line between the initial and second feature pixels and compare the obtained vector, with the vector from the centroid to the initial feature pixel and if not in the same direction multiplying by −1 the right angle vector, e') selecting from the feature pixels within a predetermined radius of the second feature pixel a third feature pixel whereby the line between the third and second feature pixels defines with the line from the second feature pixel and the initial feature pixel the smallest exterior angle, f') repeating step e') until get to within a predetermined distance from the initial feature pixel and the outward vector points in the same direction while maintaining a record of the linked feature pixels, and g') provided that if step f') fails, reverting to the initial feature pixel and for each feature pixel in the record adding a predetermined number (such as for example a number in the range of 1 to 10, e.g. 3) of feature pixels behind each feature pixel in the record to fill in a predetermined area behind each feature pixel in the record and repeating steps b') to e') from the initial pixel.

In steps c'), e') and f'') the predetermined radius or step length of the circle about the initial pixel may initially be chosen for example 1/100 to ¼ of the maximum length of the object computed in terms of pixels making up the image of the object.

The method may of course be incorporated into or form the basis of a computer program to facilitate speed of processing and the automation of the method. In accordance with the present invention a plurality of so processed images may be assembled (by processing through a computer with any known program suitable for the purpose) to provide a 3D image of the specimen.

In the drawings which illustrate an example embodiment of the present invention;

FIG. 5 illustrates schematically the step of processing a raw Nomarski image according to the present invention;

In accordance with the present invention optical image sections of the surface of a live motile cell may be obtained by exploiting conventional known video and computer equipment in place of expensive equipment such as confocal laser microscopy techniques (see FIG. 1); although such other equipment may of course be used in conjunction with the present invention.

In accordance with the present invention the original Nomarski images may be provided as follows:

the living cell specimen is placed in a petri dish in an inverted optical microscope to which is connected a standard video camera and the stage of the microscope is controlled by a computer driven step-motor;

the Nomarski images of the specimen on the microscope are captured sequentially while the step-motor moves the stage through a range of focal planes so as to optically section the specimen. The Nomarski images from the video camera are recorded on an analogue type video disk recorder at high speed permitting the repeated optical sectioning of the specimen on a rapid and regular basis so as to capture information about the external surface of the specimen several times a minute or every 5 seconds or less as desired.

the information on the video disk recorder is transferred to a suitable computer using a standard frame grabber apparatus to create a sequential series of 8 bit grey scale Nomarski image sections which are then processed in accordance with the present invention.

each raw slice or section image is processed to produce a binary Nomarski image section which includes only those features of the overall image which are in more or less sharp focus.

the processed image is then treated to define the boundary for that slice or section (if any);

this process is applied to each of the image sections so as to obtain a record of a sequential group of sections to produce a data base of processed slices through the specimen, each of the processed optical slices consisting of a representation of a slice segment of the outer margin of the specimen.

the surface and/or of the specimen may then be reconstructed from the digital data base by using any suitable (known) topographic reconstruction techniques (i.e. computer programmes) making any appropriate adjustments thereto as may be necessary.

Figure 1:
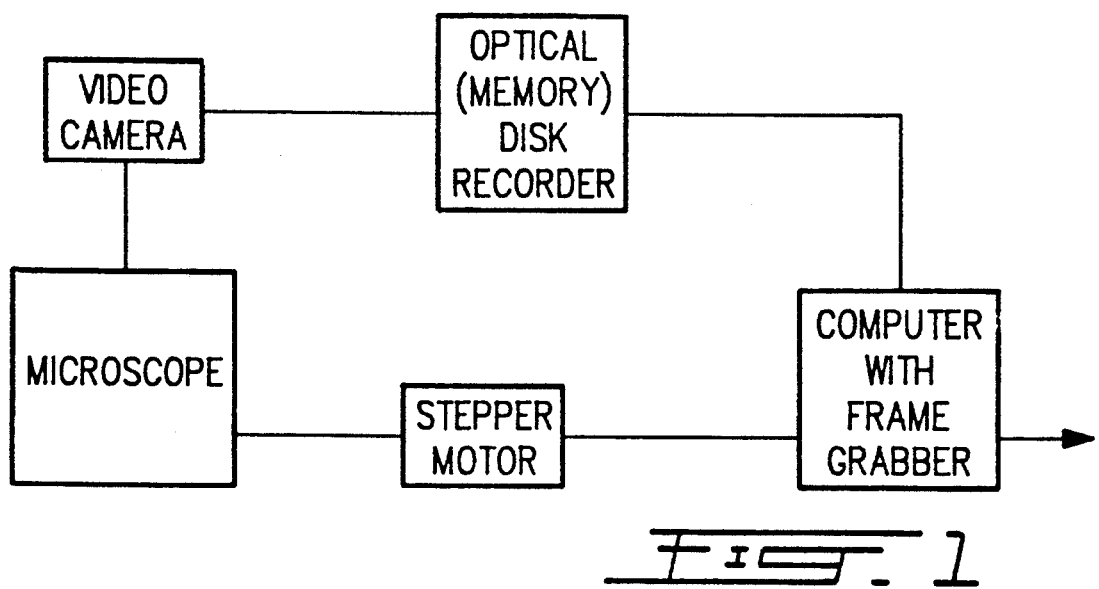
FIG. 1 is a block diagram of an optical microscope system for obtaining optical sections or slices of a specimen.
Figure 2:
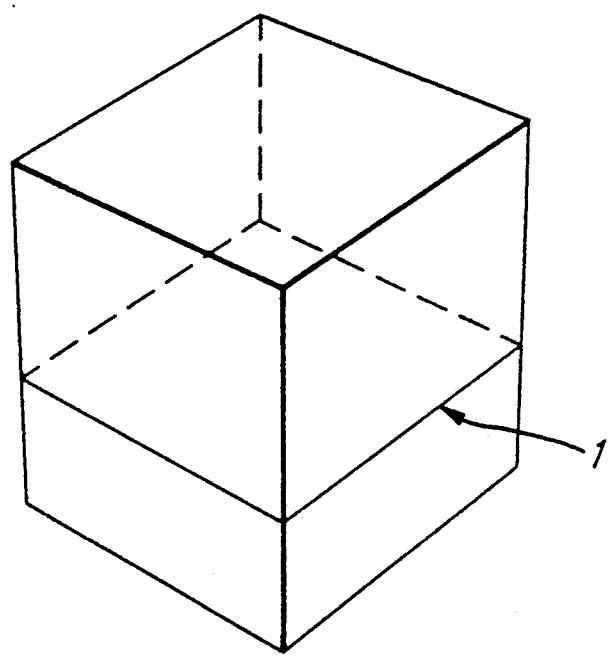
FIG. 2 illustrates a stack of image sections representing the volume image of a specimen.
Figure 3:
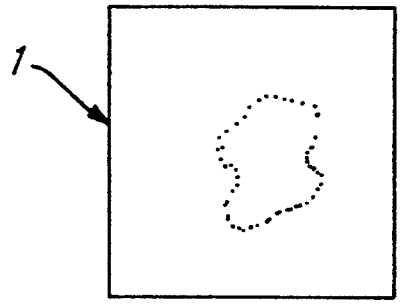
FIG. 3 shows a single image section viewed perpendicularly to the plane thereof.

Thus, for example, a specimen may comprise amoeba proteus (100 u to 200 um diameter). Referring to FIG. 1, the focal plane of a conventional optical microscope may be moved vertically under computer control through the cell by the computer giving appropriate commands to the stepper motor. Images at the different focal planes may be taken and captured onto the optical disk recorder. The amoeba movement rate is 0–6 um/-second; thus the optical slices may be taken at a rate of 32 frames per second for each volume image; one volume image comprises 32 optical sections or slices 1 (see FIGS. 2 and 3). The image slices may be digitised using a conventional frame grabber board on a suitable computer and then subsequently processed and analyzed thereby. The record of the processed cell boundaries for each slice may be assembled to display a 3D image of the cell specimen.

Figure 4:
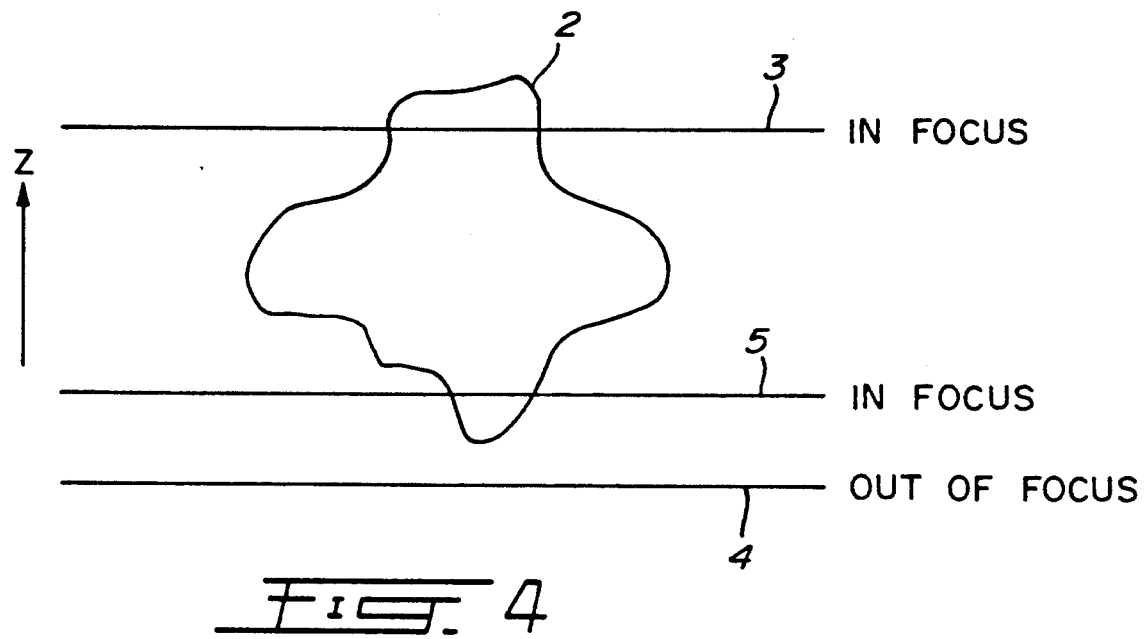
FIG. 4 illustrate the focal planes of the images used to process a raw Nomarski optical image section.

The processing of a single raw Nomarski image will now be described in relation to FIGS. 4 and 5; when dealing with a set of such raw figures each member of the set will of course be treated in like manner using the reference values obtained from the same first and second reference images. Referring to FIG. 4, this FIG. illustrates the various focal planes at which Nomarski optical images are obtained for an amoeba 2. The plane of the raw optical image section to be processed is designated by the reference number 3; the raw optical image section for the first reference optical image section is designated by the reference number 4; and the raw optical image section for the second reference optical image section is designated by the reference number 5.

Referring to FIG. 5, reference will be made to various images but it shall be understood that unless otherwise indicated or inferable from the context, such reference is to the digitised pixel data of which the image is comprised.

FIG. 5 shows three images, namely the raw image 6 to be processed, the first reference image 7 and the second reference image 8. The thickness of the in focus boundary 9 from image used as the decay constant for the gaussian smoothing filters 10 and 11; the value of the decay constant may be somewhat larger or smaller than the thickness provided that it is of the same order of magnitude.

The smoothed images 12 and 13 are then subjected to intensity gradient producing filters 14 and 15 respectively to obtain a intensity gradient, in the direction of the Nomarski effect, with respect to all of the pixel points of the smoothed image 12 and 13.

The gradients for the smoothed image 12 are then compared with the range of max/min gradients for the smoothed image 13. Those pixels of the smoothed image 12 which have an intensity gradient within the max/min range are modified so that the intensity associated therewith is set to zero, i.e. such a pixel is set so as to be turned off. The resultant processed image 16 may then, if desired, be further processed to define the feature object or objects therein (if any) and a feature object may then be further processed to render the edge or boundary of the specimen visible in the image slice. In FIG. 5 images 17 and 18 reflect boundary definition by shrink wrap constraint minimization as herein described; however, they could alternatively reflect boundary definition by the above mentioned stepping technique.

Figure 6:
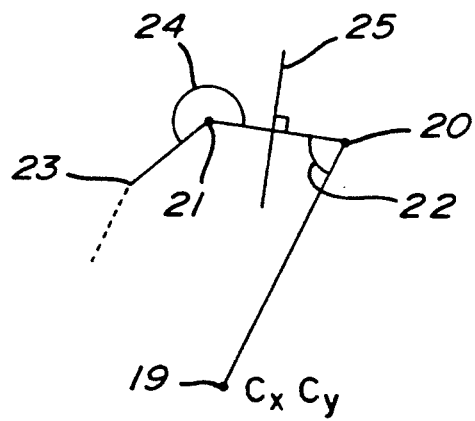
FIG. 6 illustrates the stepping technique of the present invention for rendering the edge boundary of a specimen visible.
Figure 7:
FIG. 7 is a photograph of an example of image 6 shown in FIG. 5.
Figure 8:
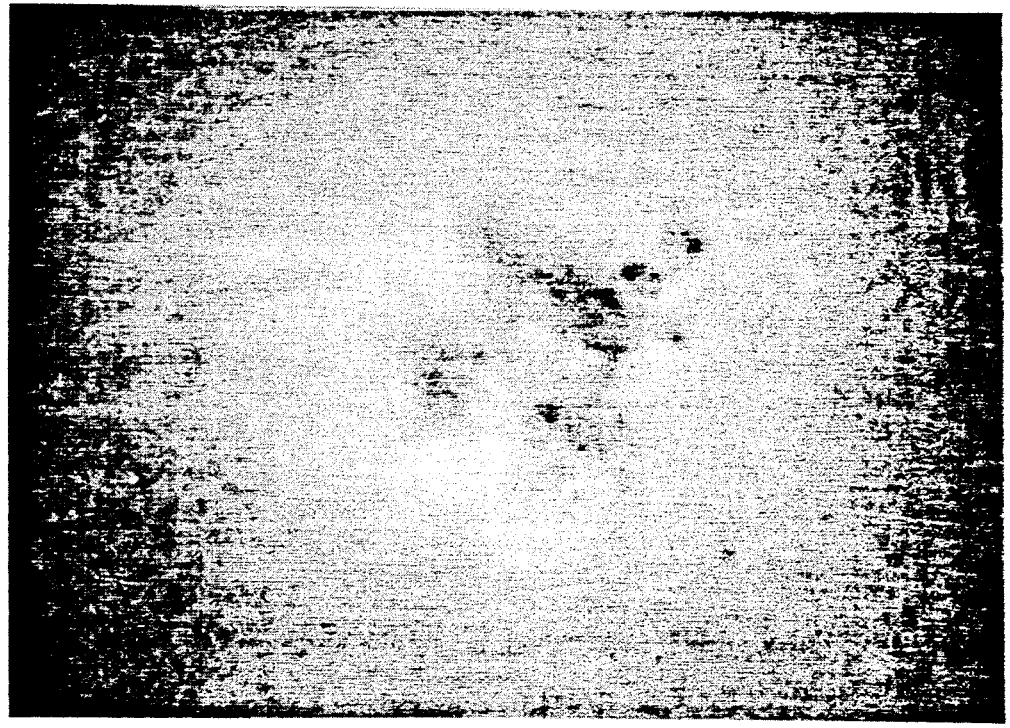
FIG. 8 is a photograph of an example of image 7 shown in FIG. 5.
Figure 9:
FIG. 9 is a photograph of an example of image 8 shown in FIG. 5.
Figure 10:
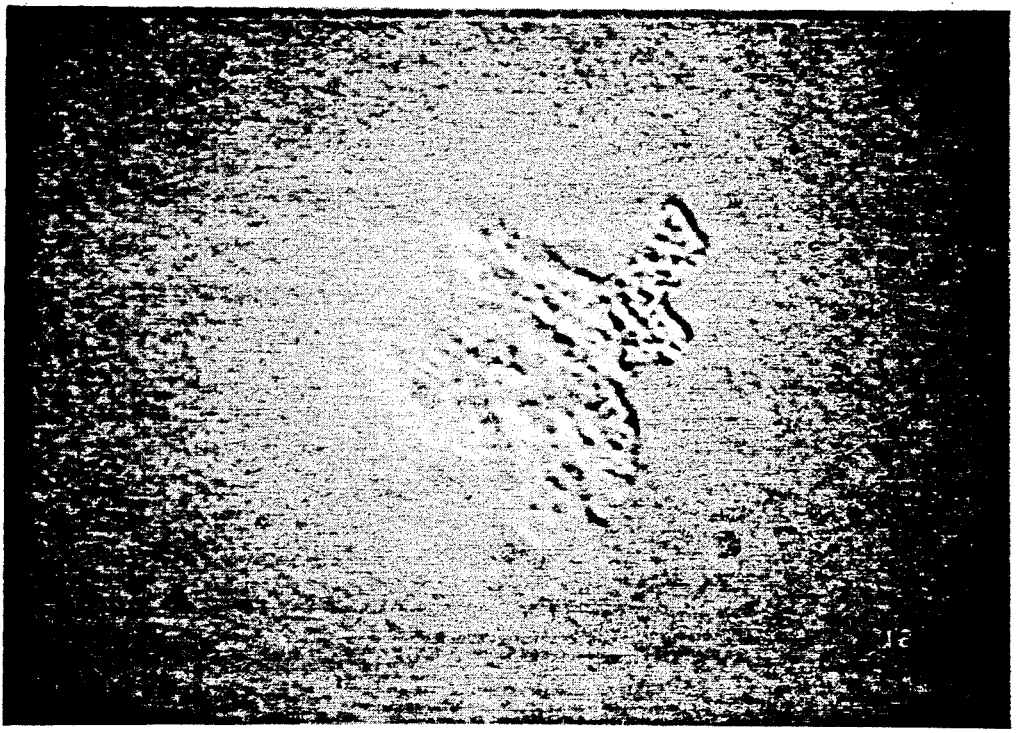
FIG. 10 is a photograph of an example of an image after being subjected to the intensity gradient filter 14 but before setting the non feature pixels' intensity to zero for image 16 as shown in FIG. 5.
Figure 11:
FIG. 11 is a photograph of an example of image 18 shown in FIG. 5 but obtained from the stepping technique with the cell boundary highlighted in white and superimposed on the original image in FIG. 7.
Figure 12:
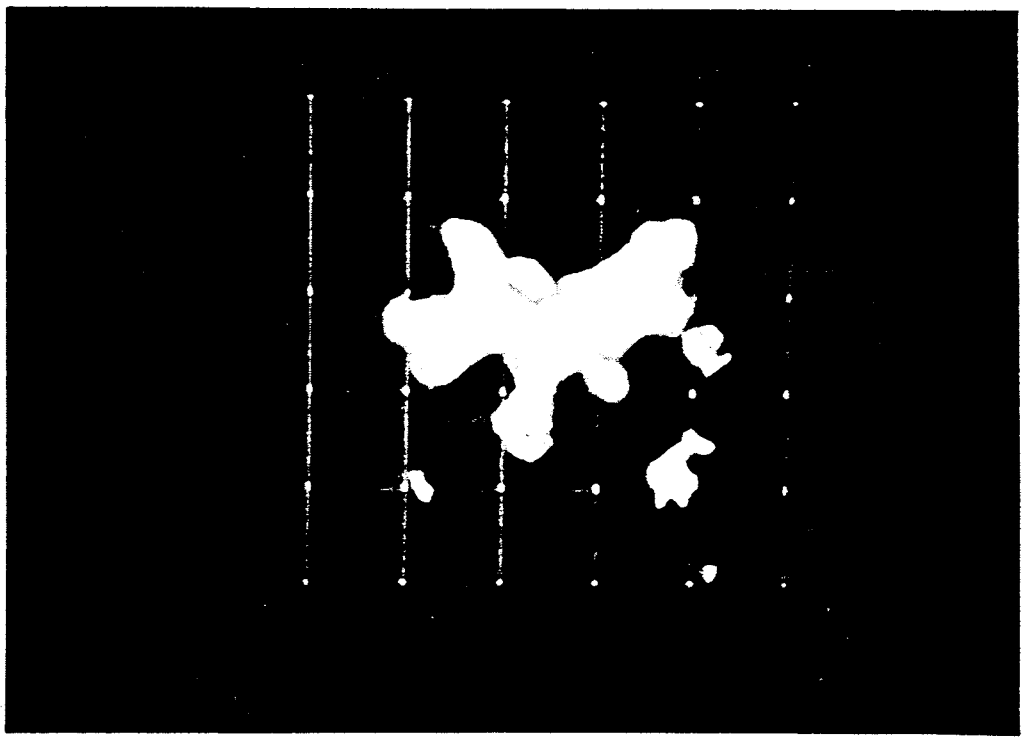
FIG. 12 is a photograph of a volumetric image of the specimen shown in FIGS. 7 to 11.

FIG. 6 illustrate the stepping technique for rendering the edge boundary visible. The centroid is designated as 19 and the initial feature pixel as 20; the following pixel 21 is within the range of the circle of predetermined radius about pixel 20. The angle 22 represent the angle between the lines defined by the centroid 19 and the pixel 20 on the one hand and the pixels 20 and 21 on the other hand. The pixel 23 is the next pixel which is within a predetermined distance from the pixel 21; the angle 24 is the exterior angle defined by the pixels 20 and 21 on the one hand and 21 and 23 on the other. Line 25 shows the direction vector.

FIGS. 7 to 12 provide illustrative photos of image sections.

We claim:

1. A method of processing one or more raw light microscope optical image sections of a specimen to generate one or more processed optical image sections therefrom, wherein said raw image sections are raw Nomarski optical image sections of the specimen in digitised form such that the raw image sections are each composed of a plurality of digitised pixel points, said method comprising, a) subjecting a said raw Nomarski image section and a raw first reference optical image section to one dimensional Gaussian smoothing, in the direction of the Nomarski effect, with a predetermined decay constant so as to obtain a smoothed original image section and a smoothed first reference image section, said raw first reference image section being an out of focus optical image section with respect to the specimen, said raw first reference optical image section being a raw Nomarski optical image section in digitised form such that the raw first reference image section is composed of a plurality of digitised pixel points, said constant being equal to the thickness in pixel points of a focused boundary of the specimen in a raw second reference Nomarski optical image section thereof, said raw second reference optical image section being a raw Nomarski optical image section in digitised form such that the raw second reference image section is composed of a plurality of digitised pixel points, b) determining for each of the smoothed image sections obtained from step a) a gradient of image pixel intensity, in the direction of the Nomarski effect, for all of the pixel points thereof, c) determining the maximum and minimum intensity gradient values for the smoothed first reference image section, and d) setting to zero, the intensity of each pixel point of the smoothed original image section which has an intensity gradient value within the range defined by the maximum and minimum intensity gradients for the smoothed first reference image so as to obtain a processed digitised optical image section, any remaining pixel points of non zero intensity in the processed image section being feature pixel points.

2. A method as defined in claim 1 including the steps of e) defining a feature object in the processed digitised optical image section obtained from step d), and f) defining the boundary of said feature object to produce a developed optical image section in digitised form such that the developed optical image section is composed of digitised and identified boundary pixel points.

3. A method as defined in claim 2 wherein a feature object is defined in step e) by defining, about each feature pixel point, a circle of predetermined radius, the radius of all of the circles being the same, a feature object being defined by those groups of feature pixel points whose circles touch.

4. A method of processing one or more raw light microscope optical image sections of a specimen to generate one or more processed optical image sections therefrom, wherein said raw image sections are raw Nomarski optical image sections of the specimen in digitised form such that the raw image sections are each composed of a plurality of digitised pixel points, said method comprising, a) subjecting a said raw Nomarski image section and a raw first reference optical image section to one dimensional derivative exponential filtering, in the direction of the Nomarski effect, with a predetermined decay constant so as to obtain a smoothed original image section and a smoothed first reference image section and to obtain a gradient of intensity, in the direction of the Nomarski effect, for all of the pixel points of the smoothed original image section and the smoothed first reference image section, said raw first reference image section being an out of focus optical image section with respect to the specimen, said raw first reference optical image section being a raw Nomarski optical image section in digitised form such that the raw first reference image section is composed of a plurality of digitised pixel points, said constant being equal to the thickness in pixel points of a focused boundary of the specimen in a raw second reference Nomarski optical image section thereof, said raw second reference optical image section being a raw Nomarski optical image section in digitised form such that the second reference image section is composed of a plurality of digitised pixel points, b) determining the maximum and minimum intensity gradient values for the smoothed first reference image section, and d) setting to zero, the intensity of each pixel point of the smoothed original image section which has an intensity gradient value within the range defined by the maximum and minimum intensity gradients for the smoothed first reference image so as to obtain a processed digitised optical image section, any remaining pixel points of non zero intensity in the processed image section being feature pixel points.

5. A method as defined in claim 4 including the steps of e) defining a feature object in the processed digitised optical image section obtained step d), and f) defining the boundary of said feature object to produce a developed optical image section in digitised form such that the developed optical image section is composed of digitised and identified boundary pixel points.

6. A method as defined in claim 5 wherein a feature object is defined in step e) by defining, about each feature pixel point, a circle of predetermined radius, the radius of all of the circles being the same, a feature object being defined by those groups of feature pixel points whose circles touch.

* * * * *